United States Patent [19]

King, Jr.

[11] 4,164,807
[45] * Aug. 21, 1979

[54] METHOD OF FORMING A COLDWORKED JOINT

[76] Inventor: John O. King, Jr., 3990 N. Ivy Rd., Atlanta, Ga. 30342

[*] Notice: The portion of the term of this patent subsequent to Sep. 17, 1991, has been disclaimed.

[21] Appl. No.: 668,489

[22] Filed: Mar. 19, 1976

Related U.S. Application Data

[60] Division of Ser. No. 501,487, Aug. 29, 1974, Pat. No. 3,949,535, which is a continuation-in-part of Ser. No. 324,485, Jan. 17, 1973, Pat. No. 3,835,688, which is a continuation-in-part of Ser. No. 268,478, Jul. 3, 1972, Pat. No. 3,835,615, which is a continuation-in-part of Ser. No. 33,281, Apr. 30, 1970, abandoned, which is a continuation-in-part of Ser. No. 711,368, Mar. 7, 1968, abandoned.

[51] Int. Cl.² .................. B21D 39/00; B23P 11/02
[52] U.S. Cl. .................. 29/523; 29/526 R; 72/370; 85/1 R; 85/7; 403/408
[58] Field of Search .................. 29/446, 523, 526 R; 85/1 R, 7; 72/370; 403/408

[56] References Cited

U.S. PATENT DOCUMENTS

| | | | |
|---|---|---|---|
| 2,146,461 | 2/1939 | Bettington | 29/523 UX |
| 2,465,144 | 3/1949 | Wyatt | 29/523 UX |
| 3,566,662 | 3/1971 | Champoux | 29/523 UX |
| 3,915,052 | 10/1975 | Ruhl | 85/7 |

Primary Examiner—Charlie T. Moon
Attorney, Agent, or Firm—B. J. Powell

[57] ABSTRACT

A method of coldworking a hole through a work piece which includes placing a seamless tubular member within the hole with a prescribed hoop strength to allow the tubular member to be expanded and prescribed column strength which prevents axial movement of the outside of the tubular member as the tubular member is expanded, holding the tubular member within the hole so that the tubular member is substantially axially fixed with respect to the hole, and passing an expansion mandrel through the inside of the seamless tubular member to radially and circumferentially expand the tubular member sufficiently to induce a compressive stress gradient of a prescribed magnitude in the material of the work piece substantially uniformly about the entire inside surface of the hole so as to increase the fatigue strength thereof. The application also discloses a method of isolating the fastener bearing interface from the inside surface of the hole of the work piece to isolate the fretting phenomenom associated with the bearing interface at the fastener from the work piece.

5 Claims, 31 Drawing Figures

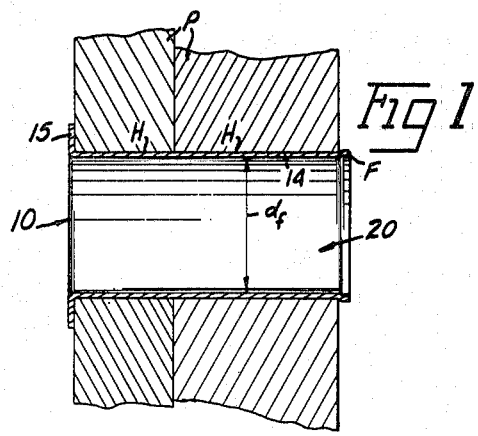
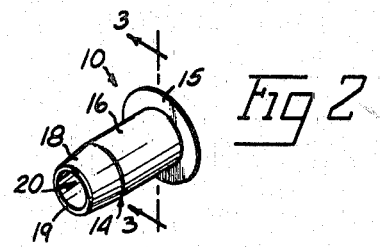
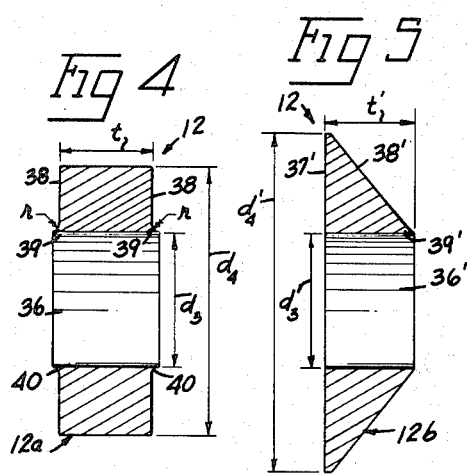
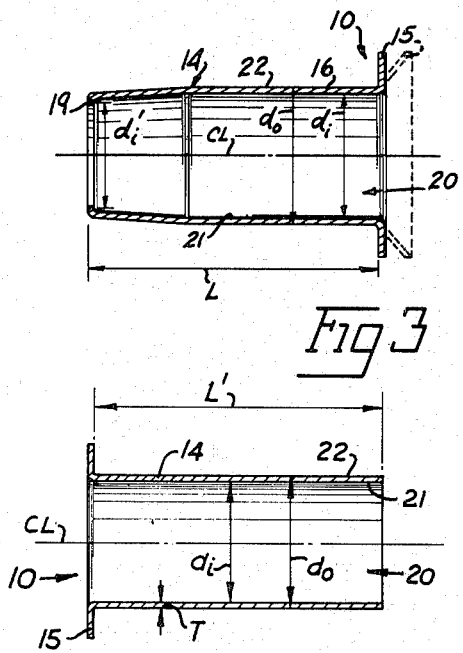
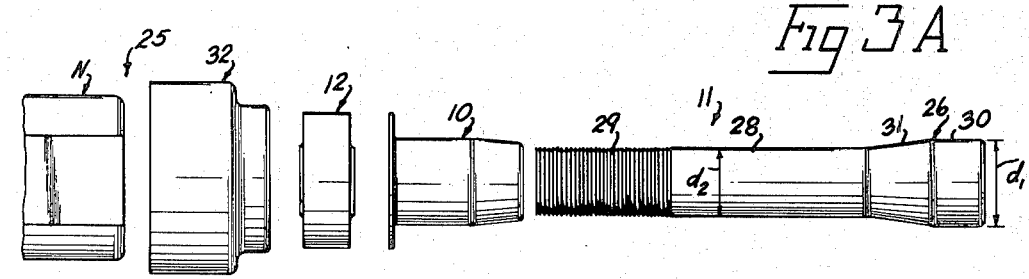
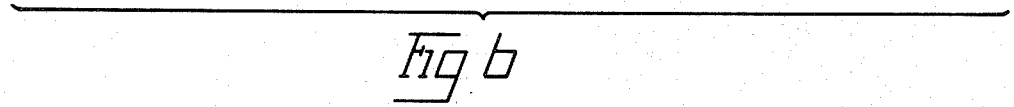

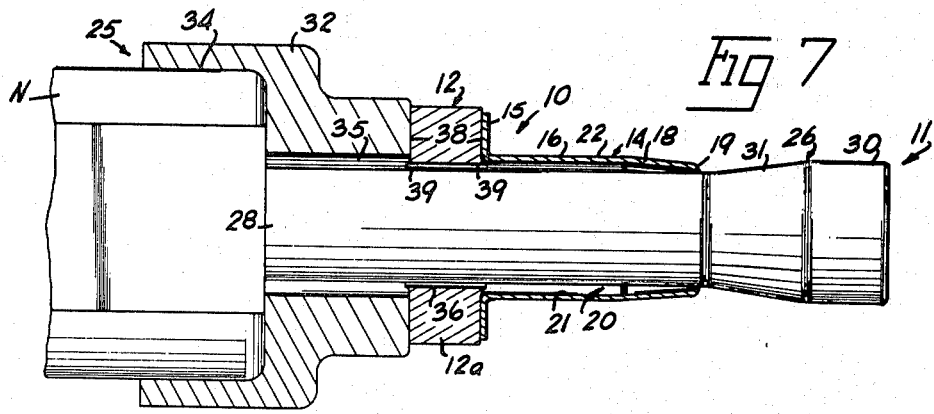
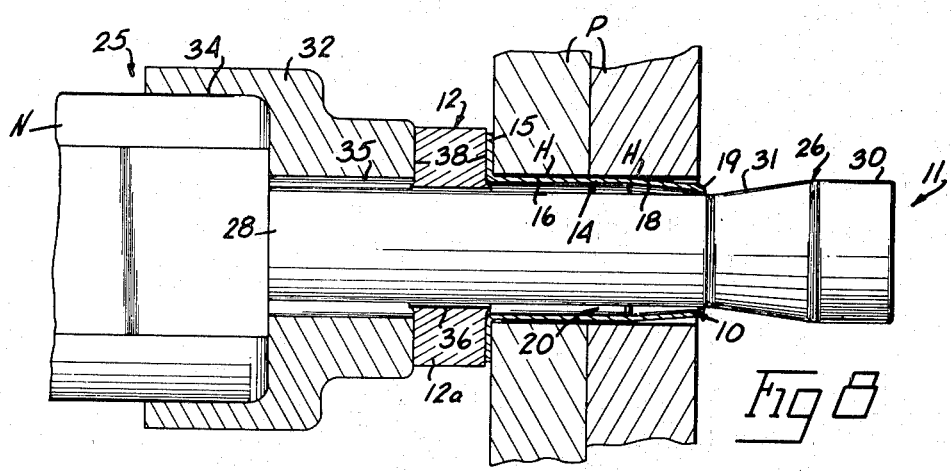
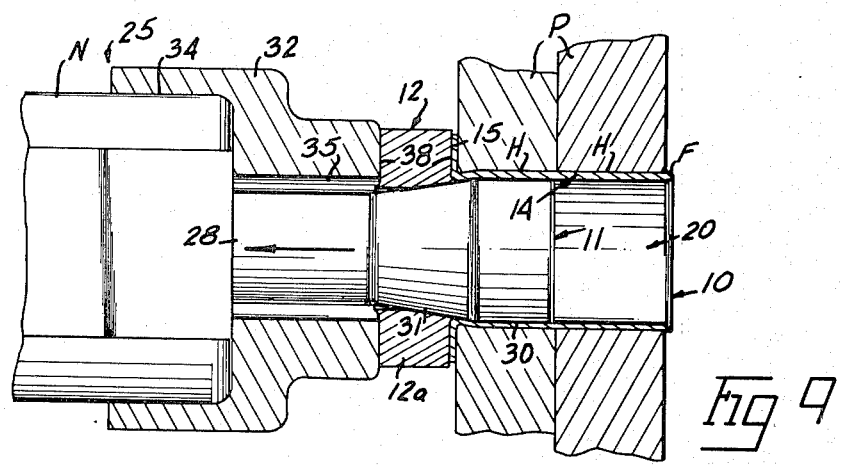

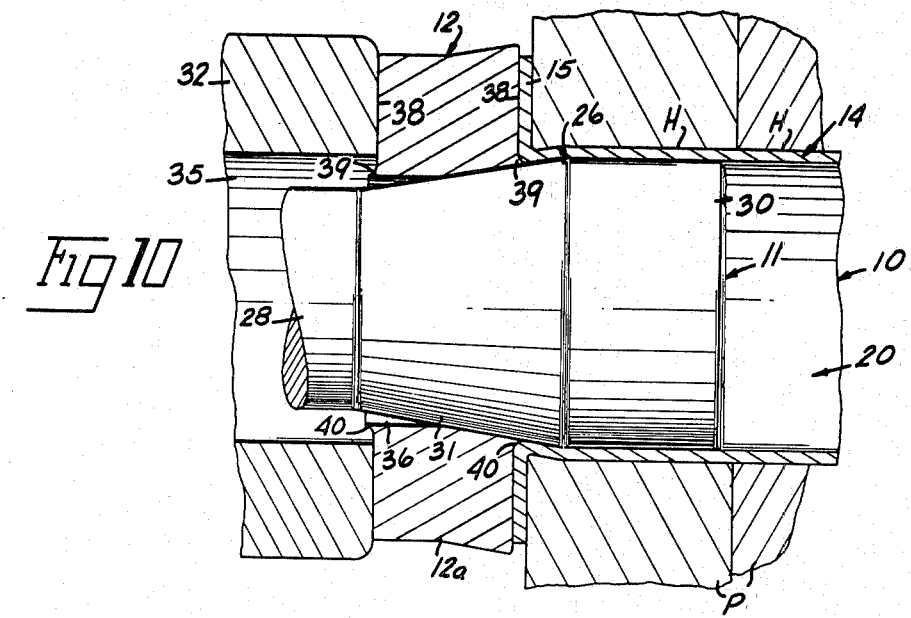
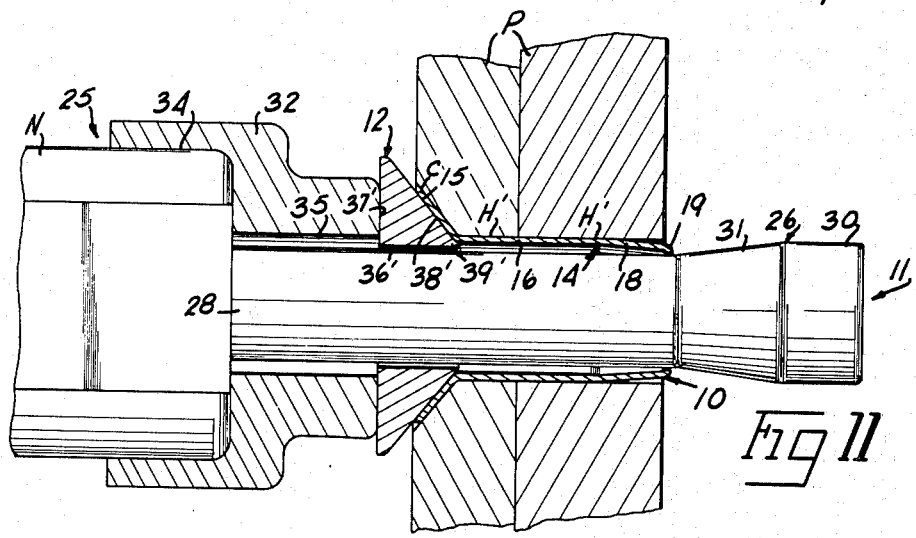
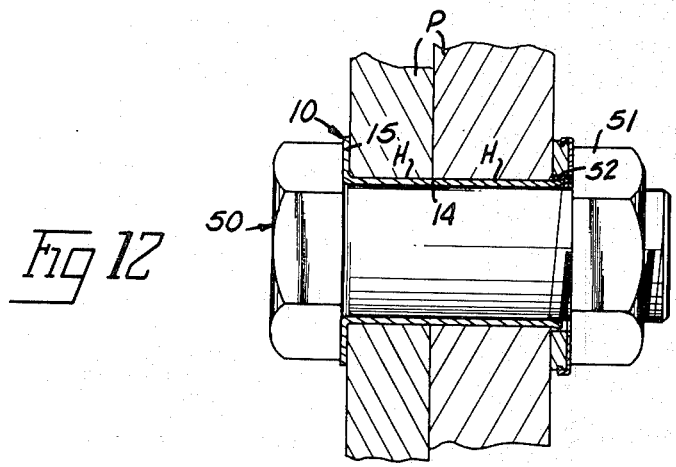

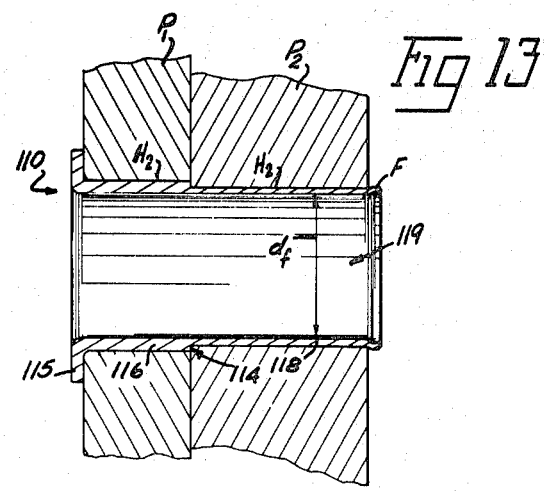
Fig 13
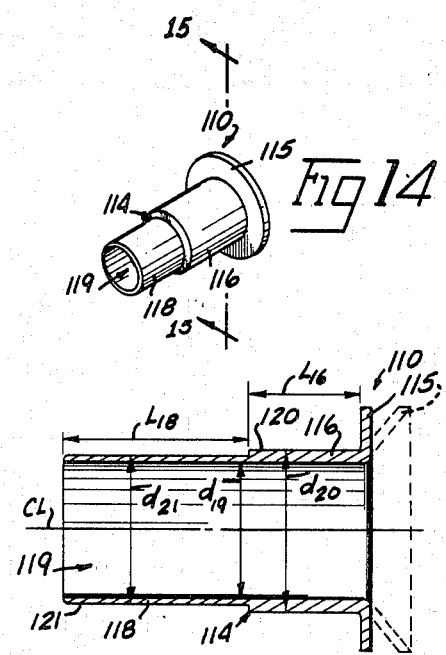
Fig 14
Fig 15
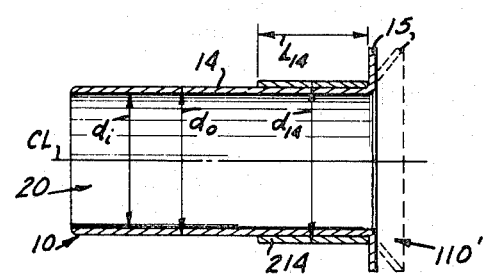
Fig 16
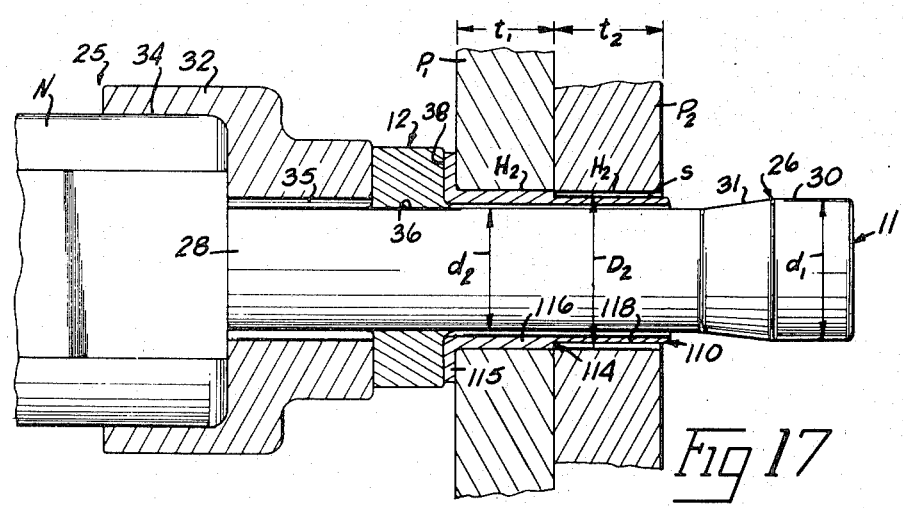
Fig 17

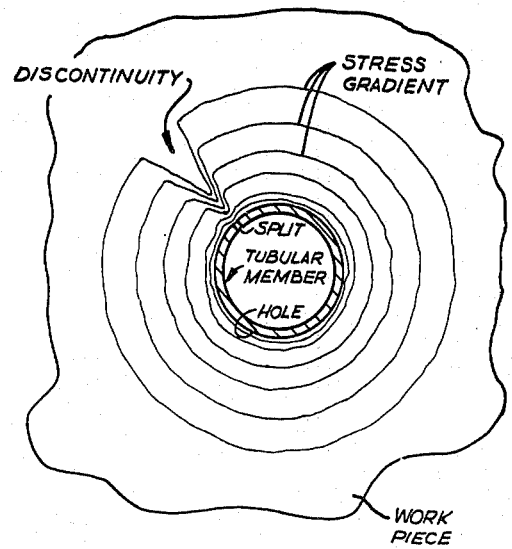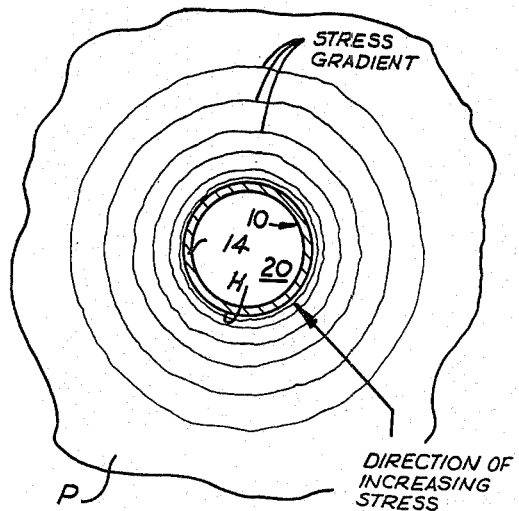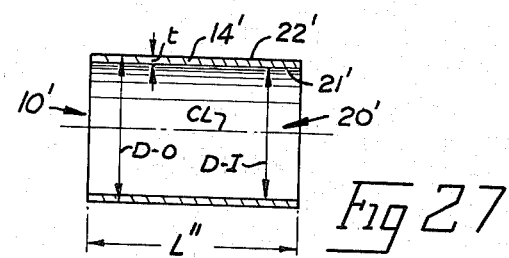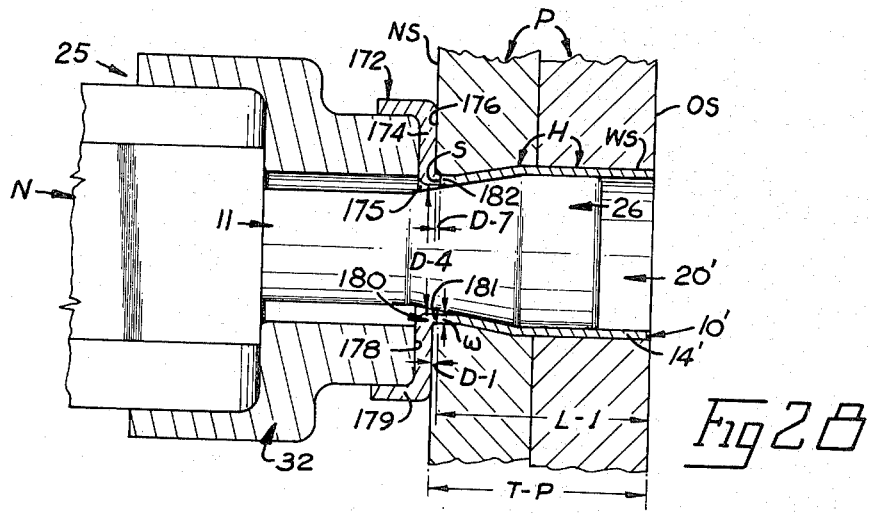

METHOD OF FORMING A COLDWORKED JOINT

CROSS-REFERENCE TO RELATED APPLICATIONS

This application is a division of my co-pending application Ser. No. 501,487, filed Aug. 29, 1974, now U.S. Pat No. 3,949,535 issued Apr. 16, 1976, for "Coldworking System with Seamless Tubular Member", which is a continuation-in-part of my earlier application Ser. No. 324,485, filed Jan. 17, 1973, how U.S. Pat. No. 3,835,688, issued Sept. 17, 1974 which is a continuation-in-part of my earlier application Ser. No. 268,478, filed July 3, 1972, how U.S. Pat. No. 3,835,615, issued Sept. 17, 1974 which is in turn a continuation-in-part of my earlier filed application Ser. No. 33,281, filed Apr. 30, 1970, now abandoned, which was in turn a continuation-in-part of my earlier filed application Ser. No. 711,368, filed Mar. 7, 1968, now abandoned.

BACKGROUND OF THE INVENTION

The fatigue life of a work piece having a hole therethrough can be increased by generating compressive stress gradients within the work piece about the hole. This has the effect of increasing the ductility of the material about the hole, and since the greatest stress concentration due to external loading occurs at the hole surface, this increased ductility serves to increase the fatigue life of the work piece.

One technique that has been used to generate these compressive stress gradients is to force a fastener into the hole where the shank of the fastener has a diameter larger than the initial diameter of the hole to produce what is commonly known as interference fit. The fastener thus exerts a radial outward force on the material about the hole to set up a radially directed compressive stress gradient in the material of the work piece about the hole to increase the fatigue life thereof. Two problems are encountered in using interference fit fasteners. The first is that, while the fastener radially and circumferentially expands the hole to generate the desirable compressive stress gradient, it also axially elongates the grains of the material at the hole surface to generate an undesirable axially oriented tensile stress gradient in these surface grains. Because tensile stress gradients in a work piece tends to decrease its ductility and thus its fatigue life, the advantageous radially oriented compressive stress gradient that is introduced by a fastener in interference fit as partially offset by the axially oriented tensile stress gradient introduced as the fastener is pressed into the hole. The second problem is that because external loading of the work piece causes a small amount of movement between the fastener shank/work piece interface, the material of the work piece at the interface will be subjected to a phenomenom called fretting, significantly decreasing the fatigue life of the work piece.

Another technique that has been used to generate compressive stress gradients in the material of the work piece about the hole is to pass an expansion mandrel having an expansion section thereon with a diameter larger than the hole axially through the hole so that the material immediately around the hole is elongated both axially and circumferentially beyond its elastic limit to cause the material immediately adjacent the hole to be permanently deformed in its expanded condition. After the mandrel has passed through the hole, the material of the work piece farther away from the hole that is not stressed beyond its yield point elastically springs back attempting to close the hole. This supplied a compressive radial load on the material immediately adjacent the hole to place a compressive stress gradient in at least part of that material immediately adjacent the hole. Such a technique is called coldworking. While the radially directed compressive stress gradient increases the fatigue life of the material about the hole, the axial elongation of the surface grains of the material immediately adjacent the hole retain their axially oriented tensile stress gradient. Thus, like the interference fit fastener, the desirable radially oriented compressive stress gradient is at least partially offset by the undesirable axially oriented tensile force gradient.

Another technique that has been used to generate the compressive stress gradient in the material adjacent the surface of the hole is a modified coldworking technique which uses a presplit tubular member, either axially split or helically split. The tubular member is placed through the hole in the work piece prior to expansion and then the coldworking mandrel with the expansion section thereon larger than the inside diameter of the tubular member is passed through the inside of the tubular member to expand the tubular member outwardly into contact with the material of the work piece at the hole surface and then expand the material of the work pieces at the hole surface sufficiently to permanently elongate the grains of the material of the work piece at the hole surface. After the mandrel has passed through the presplit tubular member, the tubular member is removed. Two problems are encountered when using this technique. The first is that the interruption in the tubular member surface at the split produces a reduced compressive stress gradient along the material at the surface of the hole and the second is that because the tubular member is allowed to move slightly axially within the hole during the coldworking operation, the axially oriented tensile stress gradient is still induced into the surface grain of the material about the hole. Thus, the desirable compressive stress gradient induced into the material at the surface of the hole is partially offset first by the lower compressive stress gradient occurring at the split in the sleeve and secondly by the axially oriented tensile stress gradient induced into the grain of the material at the surface of the hole.

Various methods and techniques are available on the market today for accurately sizing holes in work pieces for the installation of fasteners therein. The most commonly used technique is to drill a pilot hole through the work pieces and then ream this pilot hole to final size with a reamer. While drilling and reaming can be satisfactorily used in a laboratory or machine shop environment where sufficient equipment is available to both accurately drill and ream the holes, this technique has been unsatisfactory when the operation must be performed using manually held tools even though elaborate guides have been devised. This has been especially true in the aerospace industry where the use of compound surfaces and the necessity of field repair have required widespread use of manually held tools. As a result of the use of such manually held tools, widespread use of nonstandard sizes of fasteners have been required to correct improperly sized holes.

Another hole sizing technique that has been attempted is to drill a pilot hole and then pull a mandrel with an expansion section thereon through the pilot hole to finally size same. Because the material of the work pieces rebounds after the passage of the mandrel through the holes and the amount of rebound is a function of the amount the pilot hole is enlarged, it is necessary to accurately size the holes either before or after the enlarging operation with a tool such as a reamer in order to accurately determine the final hole size. Thus, because of the inability to accurately control the reaming operation when using manually held tools, this technique has been unable to accurately size holes.

SUMMARY OF THE INVENTION

These and other problems and disadvantages associated with the prior art are overcome by the invention disclosed herein by providing a technique for generating radially oriented compressive stress gradient within the material of the work piece immediately adjacent the hole which is uniform about a full 360° of the circumference of the hole and the full length of the hole and which minimizes the axially oriented tensile stress gradient induced in the grains of the material of the work piece at the surface of the hole. Further, the invention disclosed herein serves to isolate the interface at the surface of the shank of the fastener to be placed in the hole so as to reduce the fretting phenomenom normally associated with this interface from the surface of the work piece at the hole.

Where the seamless tubular member is made of a material which rebounds less upon non-elastic enlargement than the material of the work pieces about the holes, the limited rebound of the tubular member also serves to size the holes when the tubular member is left in the holes after enlargement. The tubular member limits the rebound to such an extent that the final size of the passage through the tubular member is substantially constant even though the amount of enlargement of the holes through the work pieces may vary from hole to hole. Thus, the invention is able to accurately size holes where the pilot hole tolerance is greater than that allowed in the prior art. Because the final size of the passage through the seamless tubular member is substantially constant where the amount of enlargement of the holes vary, the holes through different work pieces at the same joint may be enlarged different amounts using a seamless tubular member with a constant inside diameter and a multiple outside diameter while the final size of the passage remains substantially constant.

The invention includes the method of placing a seamless tubular member within a hole through a work piece where the tubular member has a prescribed hoop strength sufficiently low to allow said seamless tubular member to be radially and circumferentially expanded a first prescribed amount and a prescribed column strength sufficient to substantially prevent axial movement of the outside of the tubular member as the tubular member is expanded through the hole; holding the tubular member within the hole so that the tubular member is substantially axially fixed with respect to the hole; and, passing an expansion mandrel having an expansion section thereon with a maximum diameter a second prescribed amount greater than the inside diameter of the tubular member axially through the tubular member to expand the tubular member radially and circumferentially sufficiently to induce a compressive stress gradient of a prescribed magnitude in the material of the work piece substantially uniformly about the entire inside surface of the hole. The tubular member itself may be expanded beyond its yield point to induce a compressive stress gradient in the material of the work piece by the tubular member about the entire inside surface of the hole when the tubular member is left in the hole. The material of the work piece immediately adjacent the hole may be uniformly expanded through the tubular member beyond its yield point to permanently enlarge the diameter of the hole so that the elastically enlarged material of the work piece about the hole induces a compressive stress gradient in the permanently enlarged material of the work piece. The method of the invention also includes placing a seamless tubular member within the hole through the work piece; expanding the tubular member into intimate contact with the material of the work piece about the hole surface so that movement within the work piece at the hole surface is transferred through the tubular member; and then placing the fastener through the tubular member so that the shank of the tubular member is in bearing contact with the sleeve member and any movement of the work piece with respect to the fastener is transferred to the interface between the tubular member and the fastener to isolate the bearing interface at the shank of the fastener from the inside surface of the hole.

The method of the invention further includes positioning a seamless tubular member having a rebound that is less than that of the material of the work pieces in holes through the work pieces and enlarging the tubular member and the holes of the work pieces through the tubular member. This causes the tubular member to limit the amount of rebound of the material of the work pieces so that the final size of the inside of the tubular member is relatively constant even though the amount of enlargement of the holes may vary.

When it is desirable to enlarge the holes a substantially constant amount, the side wall of the seamless tubular member has a substantially constant thickness along its length with substantially constant inside and outside diameters. On the other hand, when it is desirable to enlarge the holes in the different work pieces of the same joint different amounts, the side wall of the seamless tubular member has different thicknesses along its length with a substantially constant inside diameter and multiple outside diameters.

These and other features and advantages of the invention disclosed herein will become more apparent upon consideration of the following specification and accompanying drawings wherein like characters of reference designate corresponding parts through the several views and in which:

BRIEF DESCRIPTION OF THE DRAWINGS

FIG. 1 is a cross-sectional view of a joint in which the holes through the work pieces have been sized in accordance with the invention;

FIG. 2 is a perspective view of the tubular member for use with the invention;

FIG. 3 is an enlarged cross-sectional view taken along line 3—3 in FIG. 2;

FIG. 3A is a view similar to FIG. 3 illustrating a different form for the tubular member;

FIG. 4 is an enlarged cross-sectional view of one embodiment of the backup member of the invention;

FIG. 5 is an enlarged cross-sectional view of another embodiment of the backup member of the invention;

FIG. 6 is an exploded view illustrating the assembly of the invention;

FIG. 7 is a cross-sectional view of the invention assembled for use;

FIG. 8 is a cross-sectional view of the invention in position for sizing a hole in work pieces;

FIG. 9 is a view similar to FIG. 8 showing the mandrel being withdrawn;

FIG. 10 is an enlarged portion of FIG. 9;

FIG. 11 is a view similar to FIG. 8 for countersunk holes;

FIG. 12 is a view showing a fastener installed in the joint after the holes have been sized;

FIG. 13 is a cross-sectional view of a joint in which the holes through the work pieces have been sized in accordance with an alternate embodiment of the invention;

FIG. 14 is a perspective view of an alternate embodiment of the tubular member for use with the invention;

FIG. 15 is an enlarged cross-sectional view taken along line 15—15 in FIG. 14;

FIG. 16 is a cross-sectional view similar to FIG. 15 showing an alternate form of the tubular member of FIG. 14;

FIG. 17 is a cross-sectional view of the invention using the alternate embodiment of the tubular member ready for use;

FIG. 23 is a schematic drawing illustrating the stress gradient of a prior art split tubular member coldworking technique;

FIG. 24 is a schematic drawing illustrating the stress gradient of the invention;

FIG. 27 is an enlarged longitudinal cross-sectional view of a tubular member without a head flange;

FIG. 28 is a cross-sectional view of the tubular member of FIG. 27 being installed;

Figure 18:
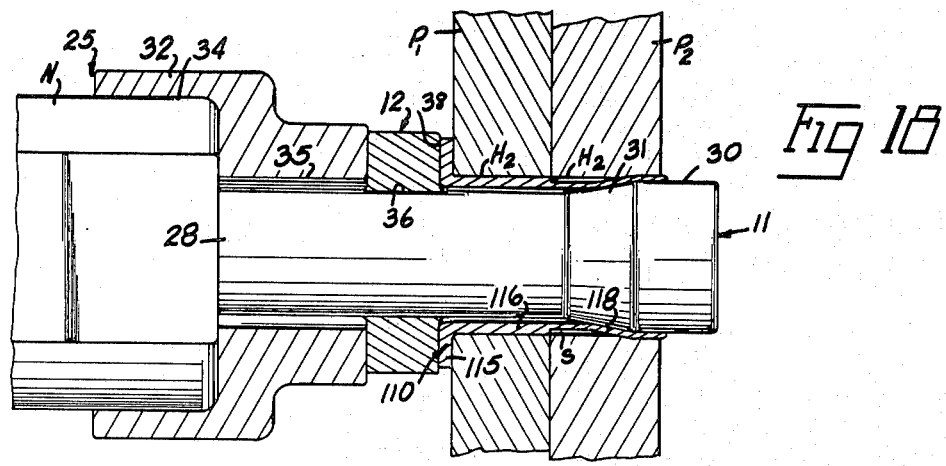
FIG. 18 is a view similar to FIG. 17 showing the mandrel being withdrawn.

These figures and the following detailed description disclose specific embodiments of the invention, however, the inventive concept is not limited thereto since it may be embodied in other forms.

DETAILED DESCRIPTION OF ILLUSTRATIVE EMBODIMENTS

Referring to the figures, it will be seen that the apparatus of the invention includes generally a seamless tubular member 10, an expansion mandrel 11 and a backup member 12. The tubular member 10 is held within pilot holes H through work pieces P by the backup member 12 while the mandrel 11 is withdrawn through the tubular member 10 to enlarge the tubular member into engagement with the work pieces and induce a radially oriented compressive stress gradient about the holes to increase the fatigue life thereof. The column strength of the tubular member 10 is sufficient to substantially prevent axial movement of the tubular member 10 with respect to the work pieces P as the mandrel 11 is forced therethrough so as to substantially eliminate any axially oriented tensile stress in the work pieces about the holes H as they are enlarged. Because the tubular member 10 is seamless, it will be noted that the compressive stress gradient will be induced uniformly a full 360° about the inside circumference of holes H and the full length of the holes.

It is known that if holes through work pieces are enlarged by moving a mandrel therethrough, the material of the work pieces about the holes rebounds or recovers for a certain percentage of the enlargement. This makes the holes after passage of the mandrel therethrough smaller than the largest diameter of the mandrel. The amount of material recovered depends on several factors including the type of material of the work pieces, the mass of the material about the holes, the initial diameter of the pilot holes and the amount the holes are enlarged. Because these factors vary, it is difficult to predict what the amount of recovery will be. This is especially true if the amount of enlargement of the holes is not accurately controlled.

It has been found, however, that if the holes are enlarged through a seamless member which has less of a tendency to recover than the material of the work pieces and this member left in the holes after the holes have been enlarged, the size of the resulting hole or passage through the seamless member is substantially constant. This is true even though the amount of enlargement of the initial pilot holes through the work pieces varies.

Referring now to FIGS. 2–3A, the seamless tubular member 10 includes a side wall 14 with a head flange 15 at one end thereof. The head flange 15 may be normal to the centerline CL of the tubular member as shown in solid lines in FIG. 3 if the resulting joint is to include an exposed head fastener or at an angle as shown by dashed lines in FIG. 3 if the resulting joint is to include a countersunk head fastener. The side wall 14 may incude a constant diameter cylindrical section 16 adjacent the head fange 15 with a tapered section 18 integral with that end of the cylindrical section 16 opposite the head flange 15. An inwardly directed lip 19 may be provided on the free end of the tapered section 18. Thus, the side wall 14 defines a passage 20 therethrough along centerline CL. The tapered section 18 and lip 19 are provided to facilitate insertion of the member 10 into the pilot holes H and to prevent damage to the inside of the holes H during insertion. It is to be further understood that the entire side wall 14 may be of constant inside diameter $d_i$ as seen in FIG. 3A.

It will further be noted that the thickness of side wall 14 is substantially constant along its length so as to define concentric inner and outer surfaces 21 and 22. The material and the thickness of the side wall 14 are such that the side wall 14 can be radially and circumferentially expanded to coldwork the material of the work piece about the hole but the column strength of the side wall 14 is sufficient to prevent axial movement of the side wall as it is expanded. Also, if the material and thickness of side wall 14 are selected so that the amount of rebound or recovery of the side wall 14 is substantially less than the material of the work pieces upon radial and circumferential enlargement of the side wall 14 beyond its yield point or elastic limit, then, the amount of rebound of the work pieces about the holes H can be controlled in a prescribed manner as will become more apparent. One such material that has been found satisfactory is stainless steel where the thickness T of the side wall 14 is approximately 0.008–0.032 inch and where the work pieces are of a material such as an aluminum alloy. It is to be understood that different materials and thicknesses may be used without departing from the scope of the invention. One kind of stainless steel that has been used satisfactorily is that manufactured by Allegheny Ludlum Steel Corp. and sold under its trademark A286. Such A286 stainless steel has a typical ultimate strength of 146,000 p.s.i. and a typical yield strength of 100,000 p.s.i. in its initial condition. The tubular member 10 is formed from a strip of the A286 stainless steel by a deep drawing operation. The resulting tubular member 10 has a sufficient column strength to substantially prevent axial movement in the side wall 14 as the side wall 14 is radially and circumferentially expanded and also has very little rebound upon enlargement beyond its yield point. Another kind of stainless steel that has been used satisfactorily is that commercially known as 302. Such 302 stainless steel has a typical ultimate strength of 110,000 p.s.i. and a typical yield strength of 45,000 p.s.i. The tubular member 10 is formed as indicated above. It is to be understood that different materials and thicknesses may be used without departing from the scope of the invention. The side wall 14 has a major outside diameter $d_o$, a major inside diameter $d_i$ and a length L as seen in FIG. 3 or length L' as seen in FIG. 3A prior to enlargement as will be more fully explained.

The mandrel 11 is designed for use with a driving unit 25 for forcing the mandrel through the tubular member 10. As seen in FIGS. 7–9, the mandrel 11 has an expansion section 26 at one end, a central support section 28, and a gripping section 29 at the opposite end thereof. The expansion section 26 defines a cylindrical sizing surface 30 at its free end with a tapered expansion surface 31 connecting the surface 30 with the support section 28. The diameter $d_1$ of the sizing surface 30 is larger than the major inside diameter $d_i$ of the member 10 and the diameter $d_2$ of the support section 28 is smaller than the diameter $d_i'$ of the hole through the lip 19. The gripping section 29 is adapted to be gripped by the unit 25 as will be explained.

The driving unit 25 includes an adapter 32 and a commercially available lockbolt installation tool (not shown) with a self-releasing pulling nose assembly N (partly shown). The gripping section 29 is provided with grooves and ridges to be engaged by the nose assembly N. The adapter 32 has a large diameter recess 34 receivable over the end of the nose assembly N with a passage 35 through the end thereof aligned with the hole in the end of nose assembly N when the adapter is in position as shown in FIG. 7. The passage 35 has a diameter such that the sizing surface 30 will just slidably pass therethrough. The adapter 32 serves as a spacer to prevent the expansion section of mandrel 11 from being caught in the nose assembly N since this section is normally larger in diameter than the opening in the end of the nose assembly. The adapter 32 is also removable from the nose assembly N so that the mandrel 11 can be easily removed from the nose assembly manually after each use.

The backup member 12 is best seen in FIGS. 4 and 5. The member 12a in FIG. 4 is for use when enlarging the member 10 for exposed head fasteners and the member 12b in FIG. 5 is for use when enlarging the member 10 for countersunk head fasteners. Member 12a is washer shaped and defines a central aperture 36 therethrough with a diameter $d_3$ at least as small as the diameter $d_i$ but larger than the diameter $d_2$ so that the member 12a can be slipped onto the support section 28 of the mandrel. Member 12a has opposed working faces 38, each of which is adapted to face the head flange 15 of the member 10. Faces 38 are normal to the aperture 36 and parallel. A protruding lip 39 is provided about the aperture 36 on each face 38. This lip 39 has an outer surface 40 with a concave cross-section of a radius r that conforms to the radius between the head flange 15 and side wall 14 at passage 20.

The backup member 12a has a thickness t and an outside diameter $d_4$ such that the member is sufficiently strong in compression through its thickness to not collapse as the mandrel 11 is being withdrawn to enlarge the member 10 but sufficiently weak in a radial direction to allow the expansion section 26 to expand same and enlarge the aperture 36 so that section 26 can pass therethrough as seen in FIG. 9. Because the tapered expansion surface 31 of the section 26 expands the aperture 36 at the same rate the side wall 14 adjacent the aperture 36 is being expanded, the side wall of the member 10 is supported to prevent the side wall from being stripped from the holes H during enlargement. This is best seen in FIG. 10. Thus, the radius between the head flange 15 and side wall 14 is maintained.

The member 12b shown in FIG. 5 is also generally washer shaped with a central aperture 36' like aperture 36 in member 12a. Aperture 36' has a diameter $d_3$ like that of aperture 36 so that the member 12b can be slipped onto the support section 28 of the mandrel 11. Unlike the member 12a, member 12b has a working face 38' which is tapered to conform to that of countersunk head flange of member 10. Member 12b has an opposite face 37' which is normal to aperture 36' like face 38 of member 12a. Because the intersection of the tapered face 38' with the aperture 36' forms a lip 39', there is no need for the additional lip required as with the member 12a. The member 12b has a maximum thickness t' and an outside diameter $d_4'$ such that the member will not collapse as the mandrel is being withdrawn to enlarge member 10 but will allow the aperture 36' to be expanded as the expansion section 26 passes therethrough simultaneously enlarging the member 10 immediately adjacent the member 12b.

The diameter $d_1$ of the sizing surface 30 is usually larger than the major inside diameter $d_i$ of member 10 in the range of 0.005–0.030 inch, depending on the desired amount the passage 20 in the seamless member 10 is to be enlarged to final diameter $d_f$ seen in FIG. 1. The diameter $d_2$ of the support section 28 is usually smaller than the initial diameter $d_i'$ of the opening in lip 19 so that the section 28 can be easily inserted into the member 10. The diameter $d_3$ of the aperture 36 through backup member 12 is usually equal to or slightly smaller than the major inside diameter $d_i$ in the order of 0.001 inch to insure that the side wall 14 of member 10 will be adequately supported during the enlargement of the member 10 to prevent the member 10 from being stripped from the holes. The thickness t and t' may be varied as long as the above criteria is met, however, it has been found that a thickness in the order of 1/16–⅛ inch is sufficient for both members 12a and 12b. The diameters $d_4$ and $d_4'$ may also be varied, however, it has been found that a diameter $d_4$ in the order of ⅛–¼ inch larger than diameter $d_3$ is sufficient and a diameter $d_4'$ in the order of ¼-⅜ inch larger than diameter $d_3'$ is sufficient. While various materials may be used for members 14, it has been found a mild annealed steel performs satisfactorily using the dimensions set forth above. Of course, it is to be understood that different diameters $d_1$, $d_2$, $d_3$ and $d_3'$ will be used for different diameters of members 10.

It is further to be understood that a headless tubular member 10' may be used to carry out the invention as illustrated in FIGS. 27 and 28. It will further be noted as seen in FIG. 28 that the near or working side NS of work pieces P normally has been deburred to form the deburred shoulder S at the juncture of holes H with side NS. The shoulder S is tapered so that its smallest diameter is recessed a distance D-1 from the side NS. The working surface WS of holes H extends from the off or rear side OS of the work pieces P to the shoulder S and has a length L-1 which is shorter than the total thickness T-P of the work pieces P by the distance D-1.

Referring now to FIG. 27, the seamless tubular member 10' includes an annular side wall 14' defining a central passage 20' therethrough about certerline CL. The member 10' has a length L" substantially equal to the length L-1 of the working surface WS of holes H as will become more apparent. The wall 14' is illustrated as having a constant diameter along its length, and the thickness t of side wall 14' is substantially constant along its length so as to define concentric inner and outer surfaces 21' and 22'. The material and the thickness of the side wall 14 are as described hereinabove with an outside diameter D-O, an inside diameter D-I prior to enlargement similarly to the tubular member 10.

While the same driving unit 25 is used to intall the tubular member 10' as the tubular members 10, a different backup member 172 is used. As seen in FIG. 28, the member 172 is a cup shaped member with a washer shaped flange 174 that is circular and defines a central aperture 175 therethrough. The diameter D-4 of the aperture 175 is substantially equal to the inside diameter D-I of the sleeve member 10' as will become more apparent. The flange 174 has a front working face 176 and a rear working face 178 opposed to face 176. An annular positioning flange 179 is integral with the outer circumferential edge of flange 174 and extends back over the rear working surface 178 a prescribed distance so that the flange 179 fits over the working end of adapter 32. The flange 179 has an inside diameter which is substantially equal to the outside diameter of the working end of adapter 32 so that when the flange 179 is positioned over the working end of adapter 32, it is a snug fit to retain the back-up member 172 in place. It will also be noted that the flange 179 and central aperture 175 are concentric with each other so that when the back up member 172 is positioned on the adapter 32 with the adapter 32 on the nose assembly N, the aperture 175 is aligned with the mandrel receiving hole in the end of the nose assembly N.

An annular lip 180 is provided around the aperture 175, is integral with the flange 174, and projects forwardly over the front working face 176 of flange 174. The lip 180 is concentric with aperture 175 and extends generally normal to the face 176 for a distance D-7 substantially equal to the distance D-1 of shoulder S on work pieces P as will become apparent. The inside of lip 180 defines a passage therethrough that serves as an extension of aperture 175. The projecting end of lip 180 defines an annular flat back-up surface 181 thereon normal to the centerline of aperture 175 and generally parallel to face 176. The back-up surface 181 has a width w corresponding to the thickness t of tubular member 10' as will become more apparent. The lip 180 defines an outwardly flaring outside surface 182 that is complimentary in shape to the shoulder S on work pieces P and the inside surface of lip 180 joins smoothly with the rear working face 178 of flange 174. It will be noted that the thickness t-1 of flange 174 is thicker than the width w of back-up surface 181 on lip 46 to provide sufficient strength to member 172 to prevent its collapse during expansion as will become more apparent. While the thickness t-1 may vary, the thickness t-1 shown is approximately twice the width w of back-up surface 181.

OPERATION

In operation, the pilot holes H are drilled through the work pieces P with a conventional drill. Because the invention is able to accept a hole tolerance greater than that presently associated with precision hole preparation where the rebound of the tubular member 10 is less than that of the work pieces, it is not necessary to ream the pilot holes to their final size as is presently done. The drill size for the holes H is selected so that the amount the holes will be enlarged while the expansion section 26 is within the holes H is in the order of approximately five and one-half percent of the final diameter $d_f$ of passage 20 or the diameter of the fastener to be used in the joint where the material of the work pieces P are of an aluminum alloy such as 2024. This range varies with different materials in work pieces P. For instance, where the material of the work pieces P is steel, the enlargement is in the order of seven percent and where the material of the work pieces P is titanium, the enlargement is in the order of four and one-half percent. Because holes can be drilled conventionally within a 0.005 inch tolerance range, this range will usually be acceptable within the overall hole enlargement range set forth above. Previously, the holes tolerance range was 0.003 inch which required the reaming operation.

If the diameter $d_1$ of the cylindrical sizing surface 30 is smaller than the initial diameter D of the pilot holes H as is usually the case, the mandrel 11, member 10 and member 12 can be assembled prior to insertion of the unit into the holes H as seen in FIG. 7. This is accomplished by sliding the tubular member 10 onto the support section 28 with the tapered section 18 and lip 19 facing the expansion section 26 of mandrel 11. Next, the backup member 14 is slipped onto the support section 28 so that its working face 38 faces the head flange 15 of member 10. Next, the gripping section 29 of mandrel 10 is inserted through the passage 35 in adapter 32 until the gripping section 29 is engaged by the nose assembly N as seen in FIG. 7. The tubular member 10' with its back-up member 172 is loaded onto driving unit 25 similarly.

The operator can then insert the tubular member 10 and mandrel 11 through the holes H until the head flange 15 rests against the work pieces P as seen in FIG. 8. It will be noted that the length L of the side wall 14 as seen in FIG. 3 may be slightly greater than the combined thickness of the work pieces P so that the end of the wall 14 protrudes from the off side of the work pieces. This amount of protrusion is usually less than 1/16 inch. The side wall 14 may have a length L' as seen in FIG. 3A substantially equal to the combined thickness of the work pieces. The driving unit 25 is then actuated to cause the nose assembly N to pull the mandrel 11 toward it while bearing against the backup member 12 to hold it and the head flange 15 against the work pieces P in opposition to the expansion section 26 of mandrel 11.

As the tapered expansion surface 31 enters the member 10, the tapered section 18 and lip 19 are first straightened and that portion protruding beyond the work pieces P is then flared outwardly as indicated at F in FIGS. 1 and 9. This serves to assist in retaining the member 10 properly located within the holes H as the section 26 passes therethrough. The section 26 continues to move through the member 10 enlarging the side wall 14 into contact with the side of the holes H and then enlarging the holes H.

Figure 25:
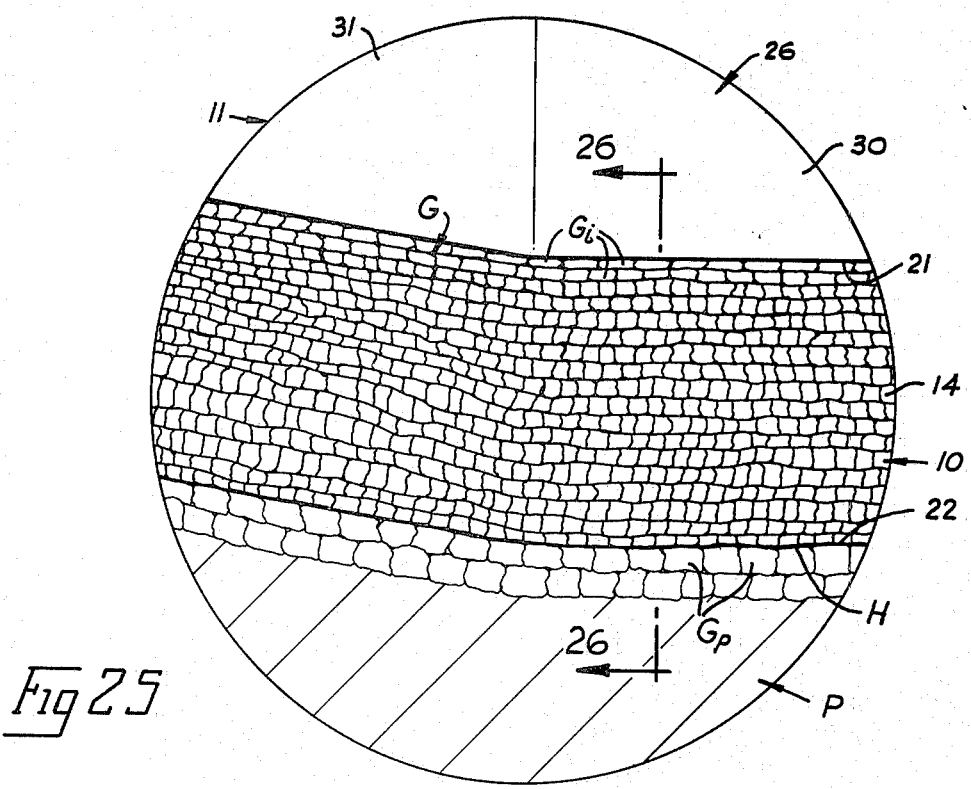
FIG. 25 is a greatly enlarged portion of FIG. 9 showing the grain structure of the tubular member.
Figure 26:
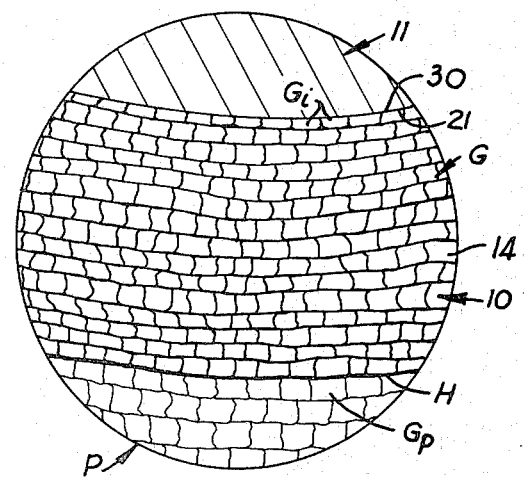
FIG. 26 is a cross-sectional view taken along line 26—26 in FIG. 25.

Referring to FIG. 26, it will be seen that the grains G of the grain structure of the side wall 14 are coldworked as the mandrel 11 is forced there through so that all of the grains G of side wall 14 are elongated in a circumferential direction. It will also be noted that the grains Gp of the material of the work piece about the holes H are also elongated in a circumferential direction about the inside surface of the hole H. The grains Gi of the side wall 14 immediately adjacent the inside passage therethrough are also elongated axially as seen in FIG. 25 because of the high frictional interface between the mandrel 30 and the side wall 14. Because the column strength of side wall 14 is sufficient to substantially prevent axial movement of side wall 14 relative to work pieces P as the mandrel 11 passes therethrough, the axial grain elongation is not transmitted through the side wall 14 and leaves the grains of the work pieces P about the holes H relatively unelongated in the axial direction. The axial elongation of the inside grains Gi of the side wall 14 causes an axially oriented tensile stress gradient to be induced into these grains, however, this axially oriented tensile stress gradient is not transmitted to the inside surface of the material at the holes so that there is virtually no additional tensile stress gradient induced into the material of the work pieces. Thus, because any tensile loading of the work pieces P does not subject the side wall 14 to tension loading, the fact that an axially oriented tension compressive stress is induced into the inside surface of the side wall 14 has no detrimental effect on the fatigue life of joint J.

Referring to FIG. 24, it will be seen that the passage of mandrel 11 through member 10 causes a compressive stress gradient to be induced into the material of the work pieces P about the holes H which is uniformly distributed both about the circumference and the length of the hole. The induced compressive stress gradient is the greatest adjacent the inside surface of the holes H and diminishes as one moves away from the hole. In the prior art technique of expanding the holes through the work piece using a split tubular member, it will be seen from FIG. 23 that a discontinuity in the uniform stress gradient pattern is induced in the work pieces about the hole in the area of the split. It will also be noted that as the hole is expanded further, the discontinuity in the stress gradient of the prior art split tubular member coldworking technique induces an even wider discontinuity in the stress gradient.

If the mandrel 11 has expanded the side wall 14 radially and circumferentially sufficiently to exceed the yield point of the material of the side wall 14, the side wall 14 becomes permanently enlarged radially and circumferentially so that the elastically enlarged portion of the material of the work pieces about the holes H forces inwardly on the side wall 14 to cause a radially oriented compressive stress gradient to be set up within the side wall 14 of the tubular member 10. Because the tubular member 10 is permanently enlarged, the hoop strength of the side wall 14 is sufficient to maintain a radially oriented compressive stress gradient in the material immediately adjacent the holes H of the work pieces when the member 10 is left in holes H. If the material of the member 10 has less rebound than that of work pieces P, then the member 10 also acts to size the holes H as will be explained.

If the radial and circumferential enlargement of the side wall 14 of tubular member 10 is sufficient to also radially and circumferentially enlarge the material of the work pieces immediately adjacent the hole beyond the yield point of the material of the work pieces, that portion of the material of the work pieces immediately adjacent the holes will also be permanently enlarged. The elastically enlarged portion of the material of the work pieces further away from the holes forces inwardly on the permanently enlarged portion to induce a radially oriented compressive stress gradient to be set up within the permanently enlarged portion of the work pieces. If the permanently enlarged tubular member 10 is also left in the permanently enlarged holes H, the radially oriented compressive stress gradient induced by the tubular member 10 will be cumulative with the radially oriented compressive stress gradient induced by the elastically enlarged portion of the material of the work pieces. Even if the radially oriented tensile stress gradient induced in the permanently enlarged portion of the work piece is not completely overcome when the elastically enlarged portion forces inwardly on the permanently enlarged portion as is sometimes the case with the prior art to render the permanently enlarged portion fatigue sensitive, a compressive stress gradient is insured throughout this permanently enlarged portion of the work pieces due to the outwardly directed radial force exerted on the permanently enlarged portion by the tubular member 10 because of its hoop strength. While this may leave the side wall 14 of tubular member 10 in a condition of radial tensile stress, this radial tensile stress does not adversely affect the fatigue sensitivity of the joint since the tubular member 10 is not subjected to tensile loading when the work pieces P are subjected to a tension load. Thus, the work pieces are subjected to a compressive stress gradient and are not fatigue sensitive. It will also be noted that the compressive stress gradient is uniform both about 360° of the circumference and the full length of the inside surface of holes H.

As indicated above, when the tubular member 10 is left in holes H after enlargement, the final diameter df of the passage 20 through tubular member 10 can be predicted. Where the material of member 10 rebounds less than the material of the work pieces P and the side wall 14 is expanded beyond its yield point or elastic limit, the final diameter df of passage 20 is a function of mandrel diameter.

Figure 22:
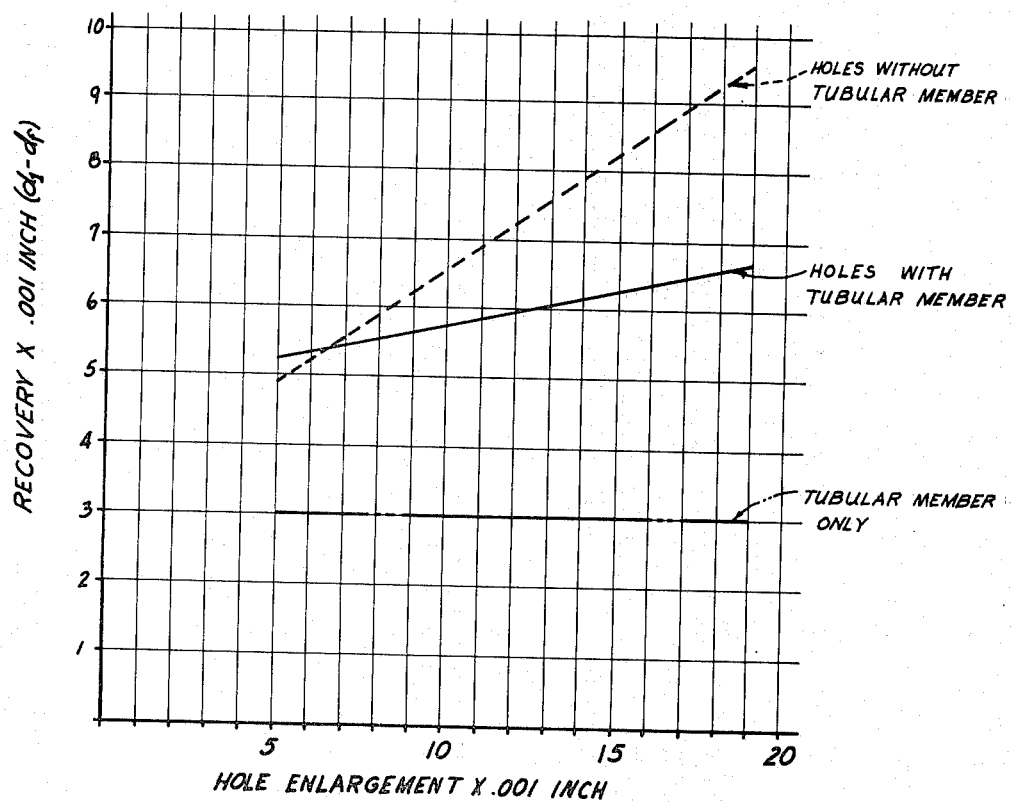
FIG. 22 is a graph illustrating the effect of the invention on hole sizing operations.

FIG. 22 is a graph resulting from a series of tests conducted by applicant to determine the effectiveness of the invention. First, a series of holes in the same diameter range were enlarged in different amounts using the invention. The diameter $d_f$ of the enlarged resulting passage 20 through the tubular member 10 was measured and compared with the always larger diameter $d_I$ of the sizing surface 30 of mandrel 11. The difference between diameter $d_I$ and diameter $d_f$ is commonly referred to as the rebound or recovery after enlargement. The rebound was then plotted against the amount of enlargement to produce the solid line in FIG. 22. Next, the test was repeated except that no member was left in the holes to limit the amount of rebound. The plot of the rebound versus enlargement is shown by a dashed line in FIG. 22. Next, the member 10 was enlarged out of the holes in the work pieces and the amount of rebound plotted against enlargement is shown by a phantom line in FIG. 22. Based on this chart then, it will be seen that the rebound using the invention is substantially constant even though the amount of enlargement varies. This means that the size of mandrel 11 determines the final size of the passage through the work pieces. Referring to FIG. 22, it will be seen that the amount of change in the rebound as the enlargement varies is well within the allowable 0.003 inch range generally permissible for hole tolerance in the aerospace industry when the invention is used, whereas such is not the case when the prior art techniques are used in which rebound is not limited. Thus, because the amount of rebound or recovery is predictable when the invention is used, the workman prepares the pilot holes with a standard drill without having to vary accurately size the pilot holes. He then selects the mandrel size for the particular desired final diameter without having to consider the amount of enlargement to the extent required by the prior art. The above tests were made in 7075 aluminum alloy.

It has also been found that where the final diameter $d_f$ is not sufficiently large, the desired final diameter can be easily achieved simply by making additional passes with larger diameter mandrels 11 through the passage 20. This is highly desirable since extensive gaging is not required to finally size the passage 20 since the multiple passes of mandrels 11 allows the workman to gradually enlarge the passage until the desired diameter $d_f$ is obtained.

As the tapered surface 31 passes out of member 10, it engages the member 12 as best seen in FIGS. 9 and 10 to expand the aperture 36 therethrough simultaneously with the expansion of the member 10 immediately adjacent the member 12. Thus, that end of member 10 on the rear side of the work pieces P is supported at all times during the passage of the expansion section 26 through member 10 to prevent the member 10 from being stripped out of the holes. A lip may be extruded on the member 12 about the aperture 36 on that side of member 12 from which the section 26 exits. The lip, however, has no detrimental effect on the work pieces P since the member 12 is discarded after the expansion of aperture 36. The member 12 cannot be reused in subsequent hole enlarging operations since the enlarged aperture 36 would not adequately support the member 10 to prevent it from being stripped out of the holes of the work pieces.

As the tapered surface 31 passes out of member 10', it engages the member 172 as best seen in FIG. 28 to expand the aperture 175 therethrough and the lip 180 simultaneously with the expansion of the member 10' immediately adjacent the member 172. Thus, that end of member 10' on the near side of the work pieces P is supported at all times during the passage of the expansion section 26 through member 10' to prevent the member 10' from being deformed by forming a lip thereon. A lip may be extruded on the member 172 about the back side of the aperture 175 from which the section 26 exits. The lip, however, has no detrimental effect on the work pieces P since the member 172 is discarded after the expansion of aperture 175 as seen in FIG. 28. The member 172 cannot be reused in subsequent hole enlarging operations since the enlarged aperture 175 would not adequately support the member 10' to prevent it from being stripped out of the holes of the work pieces. That end surface 16' of tubular member 10' at the shoulder S of work pieces P remains aligned with the juncture of the working surface WS and shoulder S. Thus, the joint J' has the tubular member 10' properly located therein for receiving a fastener.

When a conventional fastener 50 is installed through the joint J as seen in FIG. 12, an appropriate nut or washer nut 51 is used which defines a cutout 52 therein as is known in the art to fit over the protruding end of the tubular member 10. The cutout 52 would not be required for member 10' since no protruding end would be present. Because of the superior quality of the hard durable inner surface of the member 10 through which the fastener is installed, it will be seen that the fastener may be driven into interference without damaging the joint. Even if the member 10 is scratched or otherwise damaged during the placement of the fastener therethrough, the fatigue life of the work pieces is extended because the damage is segregated from the holes.

It will also be noted that the side wall 14 physically separates the work pieces P from fastener 50 inserted through the tubular member 10 where the tubular member 10 is left in position after the coldworking operation as seen in FIG. 12. Because the side wall 14 has been expanded into intimate contact with the material of the work pieces P about the holes H, the small amount of movement normally associated with the work piece/fastener interface is transferred to the interface between the inside surface 18 of the side wall 14 and the bearing surface of the fastener 50. Thus, because the tubular member 10 can elastically move with the work pieces P, any movement that would cause fretting corrosion to take place at the interface with the bearing portion of the fastener is isolated from the tubular member/work piece interface and transferred to the fastener/tubular member interface. Because the tubular member 10 is not subjected to tensile loading due to a tensile load applied to the work pieces P, the fretting corrosion normally associated with the interface at the bearing surface of the fastener 50 is significantly reduced.

When a countersunk fastener is to be used in the joint as illustrated in FIG. 11, countersunk pilot holes H' are formed with a countersink C. The head flange 15 of member 10 fits within the countersink C and is supported by the tapered work face 38' of the backup member 12b. As the mandrel 11 is withdrawn through the member 10, a sufficient force is exerted on the countersink C through member 12b and head flange 15 to work the countersink C. Previously, the countersink C had to be formed after the mandrel had passed through the holes.

To facilitate the placement of the tubular member 10 and backup member 12 onto the mandrel 11, the working face of the backup member may be bonded to the head flange 15 of the tubular member so that members 10 and 12 come as a unit. The relative movement between the backup member 12 and the head flange 15 as the mandrel 11 is pulled therethrough breaks the bond to separate the backup member 12 from the tubular member 10 as an incident to the enlarging operation.

The bonding agent should be easily cleanable so that any residue left on the head flange 15 after the bond is broken can be easily removed.

Because galvanic corrosion may be encountered between the material of the work pieces and the tubular member when the joint is in use, a protective coating may be applied to the outside surface of the tubular member. Because the tubular member is not moved longitudinally during enlargement, this coating will remain in place as the tubular member is installed. One suggested coating is a zinc chromate primer.

Also, because of the high friction forces involved, it may be desirable to lubricate the interface between the tubular member and the mandrel. While various lubricants may be used, a dry film lubricant that is commercially available has been used satisfactorily. This dry film lubricant is usually applied to the inner surface of the tubular member so that the mandrel does not have to be recoated before each use.

Figure 29:
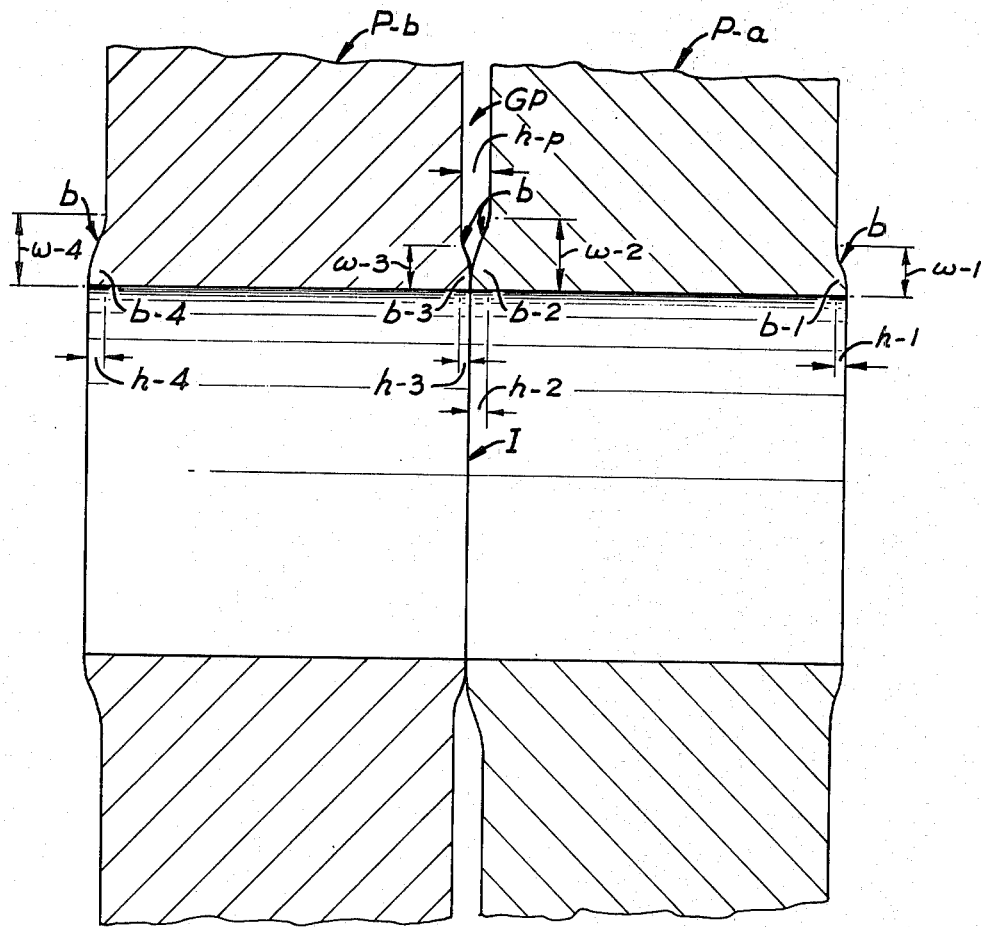
FIG. 29 is a greatly enlarged cross-sectional view of the surface upset of the work pieces due to coldworking with the prior art; and, FIG. 30 is a greatly enlarged cross-sectional view of the surface upset of the work pieces due to coldworking with the invention.
Figure 30:
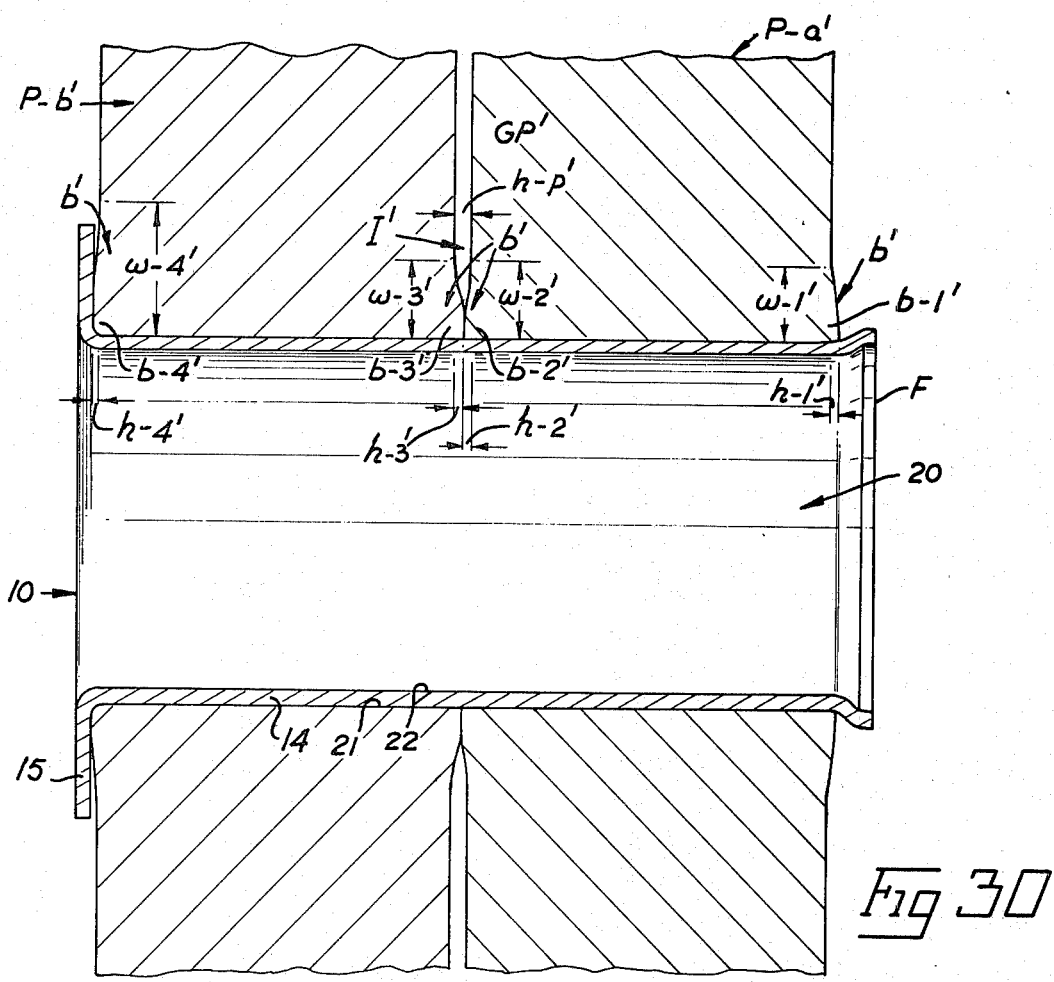

Referring to FIGS. 29 and 30, it will be noted that, because the material of work pieces P is generally incompressible, the material immediately adjacent the holes H that is expanded causes a certain displacement of the material about the holes. This displacement is directed toward opposite edges of each of the work pieces P to form a bulge b about the holes H as seen in FIG. 29. This bulge b is referred to variously as a volcano, surface upset or a bead. In the prior art coldworking systems that expand the holes H without a tubular member or with a split tubular member as seen in FIG. 29, it will be seen that a surface entry bulge b-1 is made on the back side of work piece P-a and an interface exit bulge b-2 is formed where the mandrel exits work piece P-a at the interface I. Likewise, an interface entry bulge b-3 is formed in work piece P-b where the mandrel enters work piece P-b at the interface I. A surface exit bulge b-4 is formed in work piece P-b where the mandrel exits the work piece P-b. The effects of the surface entry bulge b-1 and the surface exit bulge b-4 can be compensated for with specially designed fasteners or washers or by milling these bulges off of the work pieces. The bulges b-2 and b-3 at the interface I are much more difficult to remove without being able to separate the work pieces P as is usually the case. On the otherhand, it is the bulges b-2 and b-3 that are the more important to the joint strength because these bulges bear against each other to produce a very highly stressed area. When the joint is subsequently fatigue loaded, these bulges b-2 and b-3 are subjected to a high degree of fretting resulting in early joint failure.

As seen in FIG. 29, bulge b-1 has a height h-1 and a width w-1; bulge b-2 has a height h-2 and a width w-2; bulge b-3 has a height h-3 and a width w-3; and, bulge b-4 has a height h-4 and a width w-4. Because the bulges b-2 and b-3 bear against each other, a gap GP is left between work pieces P at the interface of height h-p that is approximately equal to the sum of heights h-2 and h-3. Thus, it will be seen that the effect of bulge b-2 is cumulative with that of bulge b-3. While the particular dimensions of the bulges b are dependent on the material of the work pieces, the amount of hole enlargement and the thickness of the work pieces, it has been found that the height h-2 in generally considerably larger than the height h-3 when using the prior art techniques which significantly increases the distance h-9 of gap GP while significantly decreasing the fatigue life of the joint.

Referring to FIG. 30, a similar joint is illustrated using the invention. Because of the lack of axial movement of the tubular member 10, it will be noted that the height of the bulges indicated by primes of the designations applied to FIG. 29 are reduced, especially at the interface I'. This is because the side wall 14 bridges the interface I' to stabilize the expansion force of the mandrel 11 as it moves through the tubular member 10. Further, it will be noted that bulge b-2' is approximately the same height as the bulge b-3' so that the height h-p' is significantly reduced over the prior art. Also, because this area of the bulges b' are larger than the prior art bulges, the heights h-2' and h-3' of bulges b-2' and b-3' are also less than the height of the prior art bulges at the interface. This serves to significantly reduce the stress at bulges b' at the interface I' so that the fatigue life of the joint is improved.

ALTERNATE EMBODIMENT OF TUBULAR MEMBER

Referring now to FIGS. 13–15 and 17–19, an alternate embodiment of the seamless tubular member is illustrated and designated 110. The member 110 is used when it is desirable to enlarge the holes through different work pieces at the same joint different amounts while providing a constant diameter fastener receiving passage in the enlarged holes. The member 110 is best seen in FIGS. 14 and 15 prior to use and is used to limit the amount of rebound of the pilot holes $H_2$ in the work pieces $P_1$ and $P_2$ upon enlargement. The tubular member 110 includes a side wall 114 with a head flange 115 at one end thereof. The head flange 115 may be normal to the centerline CL of the tubular member as seen in solid lines in FIG. 15 if the resulting joint is to receive an exposed head fastener or at an angle as shown by dashed lines in FIG. 15 if the resulting joint is to receive a countersunk head fastener.

The side wall 114 includes a major expansion, constant outside diameter cylindrical section 116 adjacent head flange 115 and a minor expansion, constant outside diameter, cylindrical section 118 integral with section 116 opposite head flange 115. The sections 116 and 118 define a common constant diameter cylindrical passage 119 therethrough. The projecting end of section 118 may be tapered and have a lip as disclosed for member 10. It will be seen that section 115 defines an outer surface 120 concentric with passage 119 with a major diameter $d_{20}$ prior to use while section 118 defines an outer surface 121 concentric with passage 119 with a minor diameter $d_{21}$ prior to use smaller than diameter $d_{20}$. The common passage 119 has a diameter $d_{19}$ prior to use smaller than diameter $d_{21}$. Section 116 has a length $L_{16}$ substantially equal to the thickness $t_1$ of the work piece $P_1$ that is to be enlarged the larger amount while the section 118 has a length $L_{18}$ slightly greater than the thickness $t_2$ of the work piece $P_2$ which is to be enlarged the smaller amount as will become more apparent.

The material of tubular member 110 is the same as that of member 10 and has the same characteristic of rebounding less than the material of the work pieces $P_1$ and $P_2$ upon enlargement. The thickness of the thinner section 118 is substantially the same as that of the side wall 14 of member 10 while the thickness of section 116 is thicker than section 118 by an amount equal to that amount the work piece $P_1$ is to be enlarged greater than work piece $P_2$. This amount ranges from 0.005–0.020 inch and is usually about 0.008 inch.

The member 110 uses the same mandrel 11, backup member 12 and driving unit 25 as the member 10 for installation. The pilot holes $H_2$ are made through the work pieces $P_1$ and $P_2$ just as holes H for using member 10. The holes $H_2$, however, are made with a constant diameter $D_2$ sufficient to receive the thicker section 116 of member 110. The tubular member 110 is loaded onto the mandrel 11 followed by backup member 12 similarly to that of member 10. The unit is inserted through the holes $H_2$ in the work piece $P_1$ first so that the thicker section 116 lies within the work piece $P_1$ while the thinner section 118 lies within the work piece $P_2$ as seen in FIG. 17. It will be noted that an annular space s is now around the outside of the thinner section 118.

Figure 19:
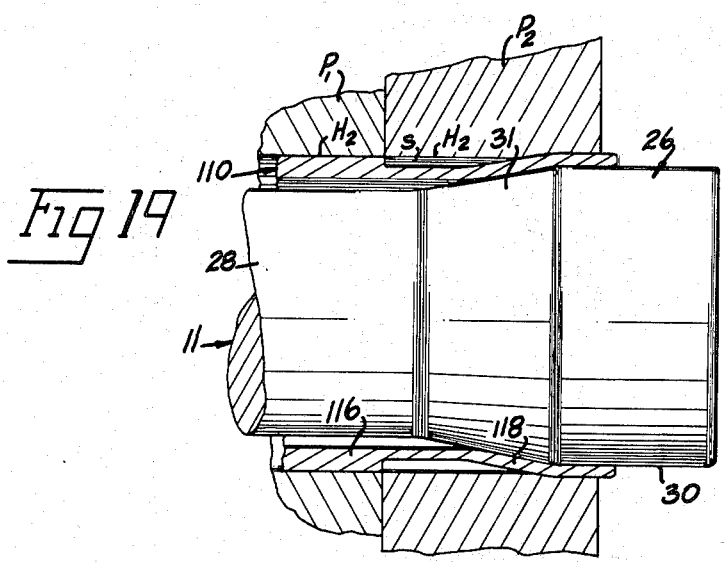
FIG. 19 is an enlarged portion of FIG. 18.

The driving unit 25 is then actuated to cause the nose assembly N to pull the mandrel 11 toward it while bearing against the backup member 12 to hold it and the head flange 115 against the work piece $P_1$ in opposition to the expansion section 26 of mandrel 11. As the tapered expansion surface 31 enters the projecting end of section 118 protruding beyond the work piece $P_2$, it flares the section 118 outwardly to first form the flange F seen in FIG. 13 to assist in retaining the member 110 in holes $H_2$. The surface 31 continues to move through the member 110 first expanding the section 118 across the space s into contact with the work piece $P_2$ and then expands the hole $H_2$ in work piece $P_2$ a first amount as seen in FIGS. 18 and 19. When the surface 31 reaches the thicker section 116, it expands the inside thereof to the same diameter as the inside of section 118. Because section 118 is thicker, this expands the hole $H_2$ in work piece $P_1$ a greater amount than the hole $H_2$ in work piece $P_2$, however, because the member 110 limits the rebound of the work pieces $P_1$ and $P_2$, the enlarged common passage 119 through side wall 114 has a substantially constant resulting diameter $d_f$ along its length as seen in FIG. 13. The backup member 12 serves the same function as described above. A fastener such as that shown in FIG. 12 can then be installed through the tubular member 110 to complete the joint.

An alternate form of the tubular member is shown in FIG. 16 and is designated 110'. The member 110' includes the tubular member 10 described above with an additional seamless tubular cylindrical section 214 around a portion of the outside of side wall 14. The member 10 shown in FIG. 16 does not have the tapered section 18 or lip 19 although they may be used. The section 214 has an inside diameter just sufficient to be forced onto the side wall 14 to the position shown in FIG. 16. The outside diameter $d_{14}$ of section 214 and the length $L_{14}$ thereof corresponds to the outside diameter $d_{20}$ and length $L_{16}$ of section 116. The member 110' is installed in the same manner as member 110 and performs the same.

Figure 20:
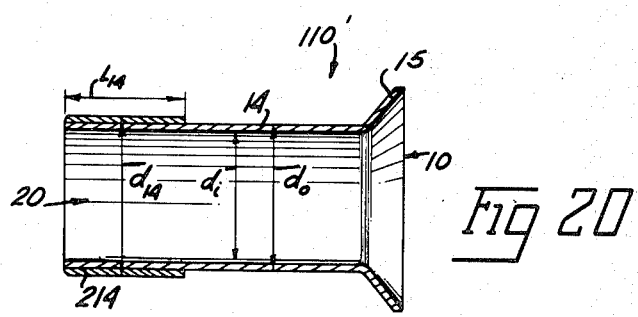
FIG. 20 is a cross-sectional view similar to FIG. 16 showing an alternate location for the major expansion section on the tubular member.
Figure 21:
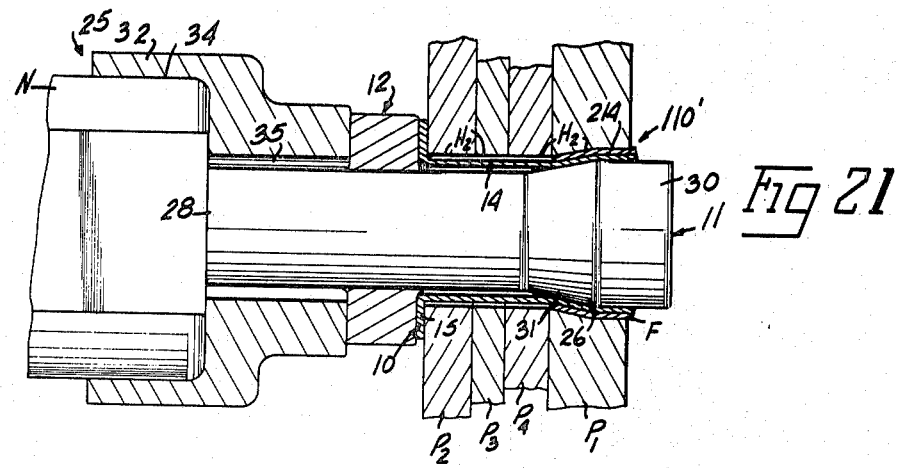
FIG. 21 is a cross-sectional view showing the tubular member of FIG. 20 in use.

FIG. 20 shows a tubular member 110' in which the major expansion section 214 is located on the distal end of the member 10 rather than adjacent the head flange 15. With section 214 on the distal end of side wall 14, the holes $H_2$ of the underlying work piece can be enlarged a greater amount than the exposed work piece. The member 110' shown in FIG. 20 is illustrated in use in FIG. 21. The flange F' formed when the mandrel 11 initially engages the side wall 14 and section 214 prevents the section 214 from slipping as the mandrel continues to move through member 110'. Thus, it will be seen that the holding member 12 prevents the shifting of section 214 along the member 10 when it is located adjacent head flange 15 as seen in FIG. 16 while the flange F' prevents it from shifting when it is located on the distal end of side wall 14. It is to be understood that member 110 may have the major expansion section 116 located like that of sleeve 110' in FIG. 20 and perform in the same way. Also, FIG. 21 illustrates the use of the invention on more than two work pieces, here designated as $P_1$–$P_4$.

Because the amount of rebound of the tubular members 110 and 110' is related to mandrel diameter rather than amount of expansion of holes $H_2$, the diameter $d_f$ of passage 119 or 20 is substantially constant along its length. The increase in fatigue life is similar to that already discussed.

While specific embodiments of the invention have been disclosed herein, it is to be understood that full use may be made of modifications, substitutions, and equivalents without departing from the scope of the invention.

I claim:

1. A method of coldworking a hole through a work piece comprising the steps of:
   placing a metal seamless cylindrical tubular member with a uniform wall thickness within the hole having a prescribed hoop strength sufficiently low to allow said seamless tubular member to be non-elastically radially and circumferentially expanded and a prescribed column strength sufficient to substuantially prevent axial movement of the outside of the tubular member as the tubular member is expanded within the hole;
   holding the tubular member within the hole so that the tubular member is substantially axially fixed with respect to the hole;
   passing an expansion mandrel having an expansion section thereon with a maximum diameter greater than the inside diameter of the tubular member axially through the inside of the tubular member in a first direction so that the expansion section slides completely through the length of the tubular member to sequentially nonelastically expand the tubular member radially and circumferentially beyond its yield point as the expansion section passes therethrough sufficiently to force the outside of the tubular member into contact with the surface of the hole and to cause the tubular member to uniformly enlarge the hole along its length; and
   leaving the tubular member in the hole so that the tubular member maintains a first radially oriented compressive stress gradient of a prescribed magnitude within the material of the work piece substantially uniformly about the entire inside surface of the hole.

2. The method of claim 1 wherein the step of passing the expansion mandrel axially through the inside of the tubular member also causes the tubular member to sequentially radially and circumferentially expand the material of the work piece substantially uniformly about the entire surface of the hole as the expansion section passes through the tubular member so that the material of the work piece immediately adjacent the surface of the hole is radially and circumferentially expanded beyond its yield point to permanently enlarge the diameter of the hole and so that the material of the work piece further away from the surface of the hole is elastically expanded to cause the elastically enlarged material of the work piece about the hole to induce an additional second radially oriented compressive stress gradient of a prescribed magnitude in at least part of the permanently enlarged material of the work piece substantially uniformly about the hole.

3. A method of coldworking aligned holes through work pieces comprising the steps of:

placing a seamless cylindrical tubular member with a uniform wall thickness within the holes having a prescribed hoop strength sufficiently low to allow the seamless tubular member to be non-elastically radially and circumferentially expanded and a prescribed column strength sufficient to substantially prevent axial movement of the outside of the tubular member as the tubular member is expanded within the holes;

holding the tubular member within the holes so that the tubular member is substantially axially fixed with respect to the holes;

passing an expansion mandrel having an expansion section thereon with a maximum diameter greater than the inside diameter of the tubular member axially through the inside of the tubular member in a first direction so that the expansion section slides completely through the tubular member in a first direction to sequentially non-elastically expand the tubular member radially and circumferentially beyond its yield point as the expansion section passes therethrough sufficiently to force the outside of the tubular member into intimate contact with the surfaces of the holes and to cause the tubular member to uniformly enlarge the holes along their length;

leaving the tubular member in the holes so that the tubular member maintains a radially oriented compressive stress gradient of a prescribed magnitude within the material of each of the work pieces substantially uniformly about the entire inside surfaces of the holes and so that intimate contact is maintained between the inside surfaces of the holes and the outside surface of the tubular member, the thickness of the side wall of the tubular member having been selected so that when the outside of the tubular member is maintained in intimate contact with the hole surfaces, the tubular member elastically moves with the work pieces as the work pieces move, placing a fastener through the inside of the tubular member to fasten the work pieces together with the intimate contact between the tubular member and the work pieces such that the tubular member moves with the work pieces rather than with the fastener so that any movement of the work pieces with respect to the fastener is transferred to the interface between the tubular member and the fastener rather than between the tubular member and the work pieces.

4. A method of coldworking a hole through a work piece comprising the steps of:

placing a metal seamless cylindrical tubular member with a uniform wall thickness within the hole having a prescribed hoop strength sufficiently low to allow the seamless tubular member to be radially and circumferentially expanded and a prescribed column strength sufficient to substantially prevent axial movement of the outside of the tubular member as the tubular member is expanded through the hole;

holding the tubular member within the hole so that the tubular member is substantially axially fixed with respect to the hole;

passing an expansion mandrel having an expansion section thereon with a maximum diameter greater than the inside diameter of the tubular member axially through the inside of the tubular member in a first direction so that the expansion section slides completely through the length of the tubular member to sequentially expand the tubular member radially and circumferentially as the expansion section passes therethrough sufficiently to induce a compressive stress gradient of a prescribed magnitude in the material of the work piece substantially uniformly about the entire surface of the hole so that the metal grain elongation axially with respect to the hole as the mandrel is forced through the tubular member is limited to the inside of the tubular member to prevent formation of a tension stress gradient in the material of the work piece about the hole axially oriented with respect to the hole; and leaving the tubular member in the hole so that the tubular member prevents formation of an axially oriented stress gradient along the hole surface while maintaining a radially oriented compressive stress gradient uniformly about the entire inside surface of the hole.

5. A method of coldworking aligned holes through a plurality of work pieces with an interface therebetween comprising the steps of:

placing a seamless cylindrical tubular member with a uniform wall thickness within the holes having a length at least as great as the total combined thickness of the work pieces and a prescribed column strength sufficient to substantially prevent axial movement of the outside of the tubular member as the tubular member is expanded;

holding the tubular member within the hole so that the tubular member is substantially axially fixed with respect to the holes;

passing an expansion mandrel having an expansion section thereon with a maximum diameter greater than the inside diameter of the tubular member axially through the tubular member in a first direction so that the expansion section slides completely through the tubular member to sequentially expand the material of the work pieces about the holes through the tubular member radially and circumferentially to such an extent that a portion of the material of the work pieces immediately adjacent the holes is permanently enlarged with a certain volume of the material of the work pieces displaced toward opposite surfaces of each work piece to form an annular bulge about the hole through the work piece at its opposite surfaces, said tubular member bridging the interface between the work pieces to minimize the height of the annular bulges formed about the hole at the surfaces of the work pieces; and, leaving the tubular member in the holes so that the tubular member maintains a radially oriented compressive stress gradient of a prescribed magnitude within the material of the work piece substantially uniformly about the entire inside surface of the holes.

* * * * *